US012633647B2

(12) United States Patent
Wang et al.

(10) Patent No.: US 12,633,647 B2
(45) Date of Patent: May 19, 2026

(54) COMPACT HIGH-PERFORMANCE DUAL-POLARIZED QUASI-OMNIDIRECTIONAL MIMO ANTENNA APPARATUS FOR 3G/4G/5G SMALL-CELL APPLICATIONS

(71) Applicant: Norsat International Inc., Richmond (CA)

(72) Inventors: Dong Wang, Waterloo (CA); Yazi Cao, Newmarket (CA); Tong Li, Aurora (CA)

(73) Assignee: Norsat International Inc., Richmond (CA)

( * ) Notice: Subject to any disclaimer, the term of this patent is extended or adjusted under 35 U.S.C. 154(b) by 225 days.

(21) Appl. No.: 18/130,842

(22) Filed: Apr. 4, 2023

(65) Prior Publication Data

US 2024/0339748 A1 Oct. 10, 2024

(51) Int. Cl.
*H01Q 1/24* (2006.01)
*H01Q 9/16* (2006.01)
*H01Q 21/24* (2006.01)

(52) U.S. Cl.
CPC ............... *H01Q 1/246* (2013.01); *H01Q 9/16* (2013.01); *H01Q 21/24* (2013.01)

(58) Field of Classification Search
CPC ............ H01Q 1/246; H01Q 5/48; H01Q 9/16; H01Q 21/24; H01Q 21/28
See application file for complete search history.

(56) References Cited

U.S. PATENT DOCUMENTS

| | | | | | |
|---|---|---|---|---|---|
| 6,333,720 | B1 | 12/2001 | Gottl et al. | | |
| 10,868,354 | B1 | 12/2020 | He et al. | | |
| 11,018,416 | B2 | 5/2021 | Bisiules et al. | | |
| 2017/0062940 | A1 | 3/2017 | Cao | | |
| 2018/0227775 | A1* | 8/2018 | Bisiules | ................. | H01Q 21/08 |
| 2021/0104813 | A1* | 4/2021 | Bryce | ...................... | H01Q 3/06 |
| 2022/0109237 | A1* | 4/2022 | Hojjat | .................. | H01Q 15/161 |
| 2022/0359996 | A1* | 11/2022 | Yu | .......................... | H01Q 1/241 |
| 2024/0006777 | A1* | 1/2024 | Li | ........................ | H01Q 21/062 |

* cited by examiner

*Primary Examiner* — Raymond R Chai
(74) *Attorney, Agent, or Firm* — Nexus Law Group LLP; Nicholas Toth; Otto Zsigmond

(57) ABSTRACT

The present invention relates to the field of wireless telecommunication and discloses a compact, high-performance, dual-polarized, quasi-omnidirectional Multiple-Input Multiple-Output (MIMO) antenna system for small cell wireless communications. It develops a flexible platform to realize different arrangements of antenna modules for different applications for 3G, 4G, and 5G wireless systems. It includes multi-band dual-polarized antenna arrays operating at 696 MHz-960 MHz, 1695 MHz-2700 MHz, 3300 MHz-4200 MHZ, 5150 MHz-5925 MHz, high gain antenna array modules, feeding networks, power dividers, reflectors, and a radome. The invention adopts a dual-polarized MIMO antenna structure with multiple radiating antenna arrays with high isolation between radiating elements to achieve compact size, good standing wave ratio, high gain, wide operating frequency range, quasi-omnidirectional antenna pattern, and spatial diversity with less interference. In addition, the antenna structure is fully customizable, highly reliable and durable, easy to manufacture, and easy to deploy in the field.

20 Claims, 9 Drawing Sheets

COMPACT HIGH-PERFORMANCE DUAL-POLARIZED QUASI-OMNIDIRECTIONAL MIMO ANTENNA APPARATUS FOR 3G/4G/5G SMALL-CELL APPLICATIONS

BACKGROUND OF THE INVENTION

1. Field of Invention

This invention relates to wireless radio communication, and, in particular, to a compact, dual-polarized, broadband, multiband, MIMO, diversity antenna system for a small cell base station antenna system application.

2. Description of Related Art

With the rapid development of wireless telecommunications technologies, the demand for wireless networks will continue to grow. Small cell base station systems are ideal for complementing and consolidating wireless networks, especially in urban centers, areas with high user density and high demand (such as pedestrian areas), or popular city squares. They can significantly increase network capacity, that is, increase the number of people using mobile data services simultaneously in a small area while maintaining high data throughput.

A small cell base station system refers to a mobile communication cellular network with low transmission power for small coverage with a range of about 150 meters. Small cell base station antennas mostly use multiple-input multiple-output (MIMO) technology, which can further improve data throughput, system capacity, and signal quality for a better user experience.

Due to the increasingly complex electromagnetic environment in which small cell base station systems are deployed, stringent requirements are imposed on the design of small cell antennas to support small standing wave ratio, dual-polarization, high isolation, high gain, and long transmitting distance. Moreover, the design mandates an omnidirectional, multi-band, wide-band, and multi-antenna array in a very small space to achieve a compact, lightweight, reliable, and cost-effective package.

Sending the same data stream via multiple transmission paths, i.e. spatial diversity, provided by multiple antennas increases signal quality and reduces interference from other users.

U.S. Pat. No. 6,333,720 B1 ("Göttl et al.") is a patent for a dual-polarized multiband dipole antenna. It includes the first and the second radiating element modules composed of the first and second dipole elements. The first dipole elements are positioned at right angles to one another to transmit and/or receive signals in the first frequency band with two linear dual polarizations. The dipole elements form a dipole square. The second radiating element module transmits and receives signals in the second frequency band higher than the first frequency band. The second module has dipole elements orthogonally to one another and they are aligned in parallel or at right angles to the first dipole elements. The second dipoles are arranged in a cruciform structure. The antenna of Göttl et al. does not cover a broad frequency range.

U.S. Pat. No. 10,868,354 ("He et al.") is a patent for a 5G broadband antenna. This 5G broadband antenna comprises two radiating elements. both of which have a middle section with a slot therein. The antenna apparatus covers the first frequency band of 617 MHz-960 MHz, the second frequency band of 1.4 GHz-1.6 GHz, the third frequency band of 1.71 GHZ-2.7 GHZ, and the fourth frequency band of 3.3 GHZ-4.2 GHz. The antenna of He et al. does not support MIMO, antenna array, and antenna diversity.

U.S. Pat. No. 11,018,416 B2 ("Bisiules et al.") is a patent for a small cell antenna suitable for MIMO operation. The small cell antenna includes two sets of radiating elements. The first set of radiating elements is configured to generate an antenna beam that has a peanut-shaped antenna pattern in an azimuth plane. The second set of radiating elements is configured to generate an antenna beam that has a second peanut-shaped antenna pattern in the azimuth plane. The longitudinal axis of the first peanut-shaped antenna pattern in the azimuth plane is rotated approximately ninety degrees from the longitudinal axis of the second peanut-shaped antenna pattern in the azimuth plane. Bisiules et al. discloses an arrangement on each backplane of a plurality of linear antenna arrays that are arranged to each other in separate, non-overlapping vertical columns, respectively. However, such respectively non-overlapping arrangement does not fully optimize the available space of each backplane.

US 2017/0062940 A1 ("CAO") is a patent application publication for a compact wideband dual-polarized dipole antenna using a meander line component. The antenna assembly includes a pair of open-stub baluns with a radiating dual-polarized top Printed Circuit Board (PCB) perpendicular to the baluns. The radiating dual-polarized top PCB includes the meander line component. The compact dipole solution, through the use of the meander line component, may be employed in more complex multi-band products to reduce the metal required without compromising performance in a multi-band operation. The compact wideband dual-polarized dipole antenna assembly covers multiple radio frequency bands. However, CAO neither claims to support an omnidirectional small cell antenna for 3G/4G/5G wireless telecommunications, nor a wideband, high-isolation antenna system.

SUMMARY

Unlike any existing invention, this invention proposes an antenna system for small cell base station systems to support 3G/4G/5G wireless communication.

According to the invention: including multiple antenna array integration technology in a limited space.

According to the invention: including a Multiple-Input Multiple-Output (MIMO) technology.

According to the invention: Including compact, broadband, high-isolation antenna design technology According to the invention: including small standing wave ratio and dual-polarized antenna design technology.

According to the invention: including flexible platform and multiple antenna arrangements design technology.

According to the invention: including 360° omnidirectional coverage antenna design technology.

According to the invention: including efficient power dividers.

According to the invention: including efficient antenna feeding networks.

According to the invention: another technical solution adopted in this invention is to provide a multi-antenna array optimization technology.

According to the invention: including three reflectors and radome.

This antenna achieves broadband, high isolation, low VSWR, MIMO, diversity, dual-polarization, quasi-omnidirectional high performance in a very limited space.

In accordance with another aspect of the invention, there is provided a small cell MIMO (Multiple-Input Multiple-Output) antenna communications system suitable for use by a base station. The flexible small cell platform may enable different antenna arrangements for different applications. Three sector modules may operate together to form a 360-degree radiation pattern for radio coverage. Three sector modules may be combined to achieve quasi-omnidirectional coverage in the horizontal plane. The radiation elements may achieve dual-polarization, broad operating frequency bands, high isolation, low VSWR, and quasi-omnidirectional MIMO antenna performance. The multi-band and MIMO antenna array modules may achieve high gain and resolve mutual influence among elements of various frequency bands. The MIMO antenna arrays may increase system capacity and enhance interference immunity. The mechanical structure of the antenna communications system may improve reliability and consistency, may simplify the production process, may be fully customizable, and may make the system easy to install and troubleshoot.

The three sector modules may include a combination of sector modules. Each sector module may include four different antenna modules. The antenna modules include the first group associated with the first frequency band from 696 MHz-960 MHz, the second group with the third frequency band from 1695 MHz-2700 MHz, the third group with the fourth frequency band from 3300 MHz-4200 MHz, and the fourth group with the second frequency band from 5150 MHz-5925 MHz. An antenna module may include a planar dipole antenna that employs slot radiating elements at the top of the radiating element formed therein. The antenna module may include one or more of a transformer, feeding networks, and power splitters. Different combinations of these antenna modules can produce different applications. An antenna radiator may be made of a PCB (printed circuit board), and may achieve ultra-wideband performance. A conductor element positioned on the top surface of a radiator element may improve the bandwidth characteristic of the antenna, and may achieve desired wideband impedance characteristics. A top PCB structure of the radiator may be included in an ultra-wideband antenna. A transformer structure may be utilized at the two sides of the radiator. The transformer structure may achieve high isolation. PCB structures of the transformers may provide a high-isolation characteristic. The placements of antenna modules may optimize VSWR. The antenna modules may be placed at VSWR-optimized positions. Each port may be capable of covering a wide operating frequency range to support 3G/4G/5G wireless communications while achieving low VSWR. All the radiating elements may exhibit dual-polarization while providing high isolation. The multi-band multi-antenna arrays and system optimization may resolve mutual influence between antennas in each frequency band. The small cell antenna system may achieve high performance in a compact size. The antennas may be arranged separately to form spatial multiplexing to work under the MIMO antenna configuration. As a result, the data transmission rate can be doubled without increasing the bandwidth. The three antenna sector modules may be attached at the angle of 120° to achieve quasi-omnidirectional coverage on the horizontal plane. A very compact multi-antenna array design is realized and fully customizable to improve the gain of the antenna. The small cell antenna may include a fiberglass radome. The radome may have a height of 619.5 mm (24.4 inches), a lower width of 420 mm (16.5 inches), and an upper width of 380 mm (15.0 inches). The radome may be used to ensure high reliability in harsh environments. The flexible platform may include different arrangements of antenna modules to realize different application scenarios.

In accordance with another aspect of the invention, there is provided a multiband dual-polarized quasi-omnidirectional MIMO antenna apparatus. The apparatus includes: (a) a first-band pair of first-band sets of radiating elements for radiating in a first frequency band, the first-band pair being mounted on a sector module along a longitudinal axis defined by the sector module; and (b) a plurality of second-band sets of radiating elements for radiating in a second frequency band higher than the first frequency band, the plurality of second-band sets being mounted on the sector module along the longitudinal axis between the first-band sets of the first-band pair.

The sector module may have a length no greater than 570 mm and a width no greater than 280 mm. The longitudinal axis may be a central longitudinal axis of the printed circuit board. The first frequency band may be from 696 MHz to 960 MHz. The second frequency band may from 5150 MHz to 5925 MHz. The first-band pair may include a proximate first-band set that is proximate to one end of the sector module. The first-band pair may include a distal first-band set that is distal from the one end. The proximate first-band set may include a proximate first-band first-polarity pair of diagonally opposed radiating elements associated with a first polarity and a proximate first-band second-polarity pair of diagonally opposed radiating elements associated with a second polarity orthogonal to the first polarity. The distal first-band set may include a distal first-band first-polarity pair of diagonally opposed radiating elements associated with the first polarity and a distal first-band second-polarity pair of diagonally opposed radiating elements associated with the second polarity. The apparatus may further include a first first-band RF connector in electrical communication with the proximate first-band first-polarity pair, a second first-band RF connector in electrical communication with the proximate first-band second-polarity pair, a third first-band RF connector in electrical communication with the distal first-band first-polarity pair, and a fourth first-band RF connector in electrical communication with the distal first-band second-polarity pair. Each second-band set of the plurality of second-band sets may include a second-band first-polarity pair of diagonally opposed radiating elements associated with a first polarity and a second-band second-polarity pair of diagonally opposed radiating elements associated with a second polarity orthogonal to the first polarity. The apparatus may further include a first second-band RF connector in electrical communication with both diagonally opposed radiating elements of the second-band first-polarity pair of each of the second-band sets, and may further include a second second-band RF connector in electrical communication with both diagonally opposed radiating elements of the second-band second-polarity pair of each of the second-band sets. The plurality of second-band sets may include four of the second-band sets. Each second-band set of the plurality of second-band sets may be mounted along the longitudinal axis. The sector module may define a left side of the sector module and may define a right side of the sector module. The apparatus may include a plurality of left-side third-band sets of radiating elements for radiating in a third frequency band having frequencies between the first and second frequency bands, and may further include a plurality of right-side third-band sets of radiating elements for radiating in the third frequency band. The plurality of left-side third-band sets may be disposed on the sector module at the left side. The plurality of right-side third-band sets may be disposed on the sector module at the right side. The third frequency band may be from 1695 MHz to 2700 MHZ. Each left-side third-band set of the plurality of left-side third-band sets may include a left-side third-band first-polarity pair of diagonally opposed radiating elements associated with a first polarity and a left-side third-band second-polarity pair of diagonally opposed radiating elements associated with a second polarity orthogonal to the first polarity. Each right-side third-band set of the plurality of right-side third-band sets may include a right-side third-band first-polarity pair of diagonally opposed radiating elements associated with the first polarity and a right-side third-band second-polarity pair of diagonally opposed radiating elements associated with the second polarity. The apparatus may further include a first third-band RF connector in electrical communication with both diagonally opposed radiating elements of the left-side third-band first-polarity pair of each of the left-side third-band sets, a second third-band RF connector in electrical communication with both diagonally opposed radiating elements of the left-side third-band second-polarity pair of each of the left-side third-band sets, a third third-band RF connector in electrical communication with both diagonally opposed radiating elements of the right-side third-band first-polarity pair of each of the right-side third-band sets, and a fourth third-band RF connector in electrical communication with both diagonally opposed radiating elements of the right-side third-band second-polarity pair of each of the right-side third-band sets. The plurality of left-side third-band sets may include two of the left-side third-band sets. The plurality of right-side third-band sets may include two of the right-side third-band sets. The apparatus may include a plurality of left-side fourth-band sets of radiating elements for radiating in a fourth frequency band having frequencies between the first and second frequency bands, and may further include a plurality of right-side fourth-band sets of radiating elements for radiating in the fourth frequency band. The plurality of left-side fourth-band sets may be disposed on the sector module at the left side. The plurality of right-side fourth-band sets may be disposed on the sector module at the right side. The fourth frequency band may be from 3300 MHz to 4200 MHz. Each left-side fourth-band set of the plurality of left-side fourth-band sets may include a left-side fourth-band first-polarity pair of diagonally opposed radiating elements associated with a first polarity and a left-side fourth-band second-polarity pair of diagonally opposed radiating elements associated with a second polarity orthogonal to the first polarity. Each right-side fourth-band set of the plurality of right-side fourth-band sets may include a right-side fourth-band first-polarity pair of diagonally opposed radiating elements associated with the first polarity and a right-side fourth-band second-polarity pair of diagonally opposed radiating elements associated with the second polarity. The apparatus may further include a first fourth-band RF connector in electrical communication with both diagonally opposed radiating elements of the left-side fourth-band first-polarity pair of each of the left-side fourth-band sets, a second fourth-band RF connector in electrical communication with both diagonally opposed radiating elements of the left-side fourth-band second-polarity pair of each of the left-side fourth-band sets, a third fourth-band RF connector in electrical communication with both diagonally opposed radiating elements of the right-side fourth-band first-polarity pair of each of the right-side fourth-band sets, and a fourth fourth-band RF connector in electrical communication with both diagonally opposed radiating elements of the right-side fourth-band second-polarity pair of each of the right-side fourth-band sets. The plurality of left-side fourth-band sets may include three of the left-side fourth-band sets. The plurality of right-side fourth-band sets may include three of the right-side fourth-band sets. The apparatus may further include three of the sector modules oriented at 120 degrees relative to each other such that the apparatus is quasi-omnidirectional.

The plurality of left-side third-band sets and the plurality of left-side fourth-band sets may be colinear. The plurality of right-side third-band sets and the plurality of right-side fourth-band sets may be colinear.

BRIEF DESCRIPTION OF THE DRAWINGS

In drawings that illustrate by way of example only embodiments of the invention.

DETAILED DESCRIPTIONS

To make the purpose, technical solutions, and advantages of the present application clearer, the following sections will clearly and completely describe the technical solutions in the embodiments of the present application with reference to the accompanying drawings in the embodiments of the present application. The described embodiments are only some, but not all, embodiments of the present application. Based on the embodiments in this application, all other embodiments obtained by those of ordinary skill in the art without creative efforts shall fall within the protection scope of this application.

Figure 1:
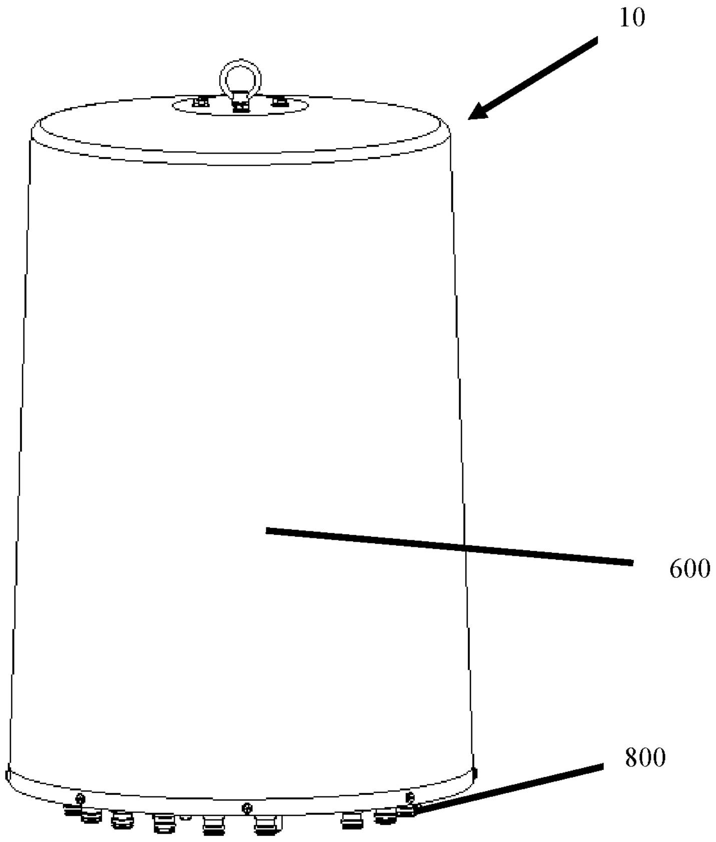
FIG. 1 is a perspective view of a small cell antenna, showing a radome.
Figure 2:
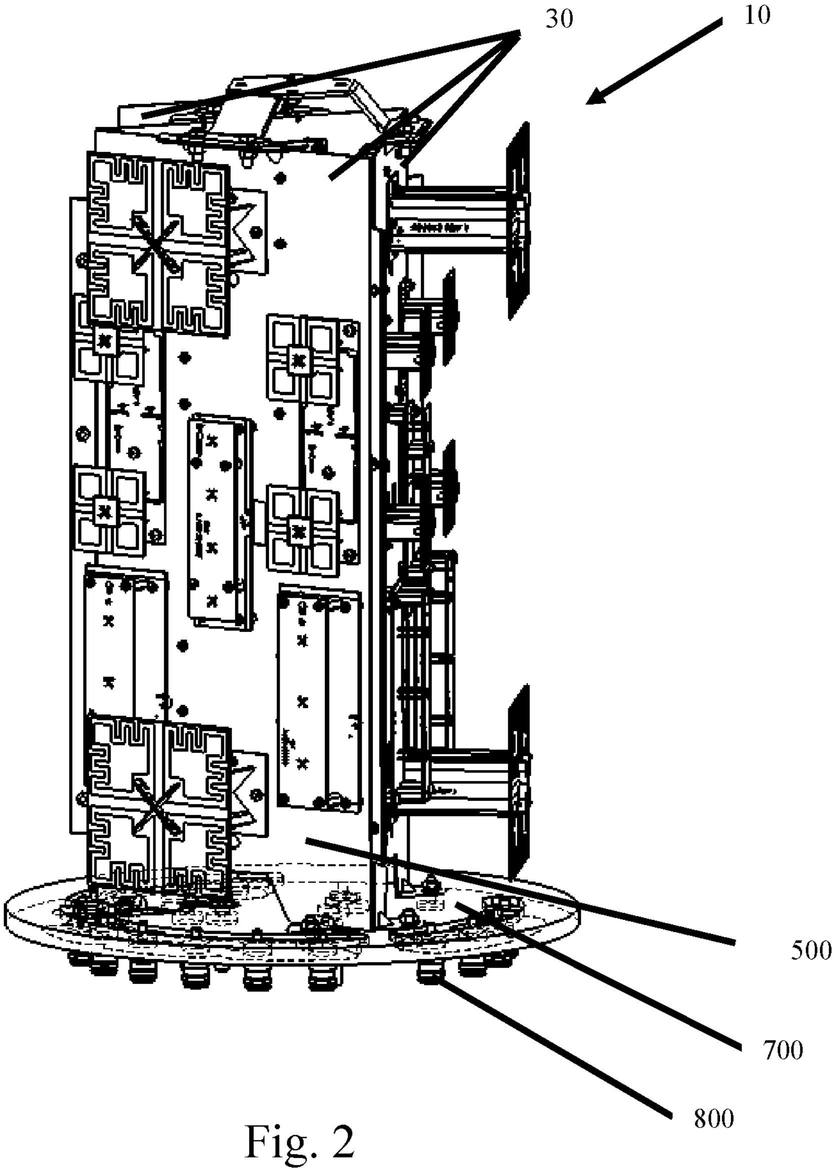
FIG. 2 is a perspective view of the small-cell antenna shown in FIG. 1 with its radome cover removed, showing antenna radiating elements, antenna modules, sector modules, RF connectors, and a base plate.
Figure 3:
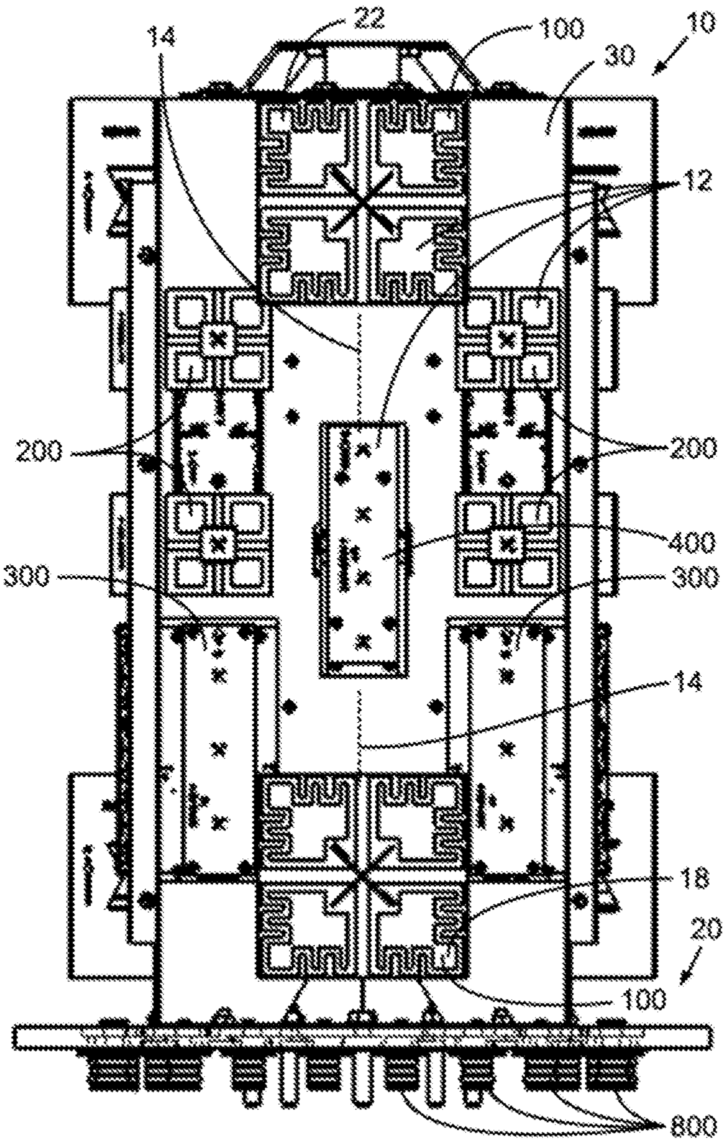
FIG. 3 is an elevation view of the small-cell antenna shown in FIG. 2 without its radome, showing a front view of one sector module.

The present application will be further described in detail below through specific embodiments in conjunction with the accompanying drawings. FIG. 1 illustrates a radome cover 600 assembly. It has a pleasing aesthetic appearance. In at least some embodiments, the radome 600 has a height of 619.5 mm (24.4 inches), a lower width of 420 mm (16.5 inches), and an upper width of 380 mm (15.0 inches). The compact structure results in a lightweight unit. FIG. 1 shows a multiband dual-polarized quasi-omnidirectional MIMO (Multiple-Input, Multiple-Output) antenna apparatus 10 according to one embodiment. FIG. 2 illustrates the small-cell architecture, showing the apparatus 10 with the radome 600 removed for ease of viewing internal features according to the small-cell architecture. The apparatus 10 includes three sector modules 30 shown in FIG. 2. Based on this sectorized design, there is no RF blind spot. Each of the sector modules 30 shown in FIGS. 2 and 3 includes four antenna modules 100, 200, 300, and 400 (FIG. 3). In the illustrated example of FIG. 2, each sector module 30 is shaped as a 120° sector of a cylinder, enabling a three-sector small cell site with 3 sector modules 30. The three sector modules 30 oriented at 120° relative to each other renders the apparatus quasi-omnidirectional.

Referring to FIG. 3, the sector module 30 comprises four antenna modules 100, 200, 300, and 400. Various of the antenna modules 100, 200, 300, and 400 includes a radiator, a transformer, a feeding network, and a power splitter. The first antenna module 100 is tuned to the first frequency band from 696 MHz-960 MHz, the second antenna module 200 to the third frequency band from 1695 MHz-2700 MHz, the third antenna module 300 to the fourth frequency band from 3300 MHz-4200 MHz, and the fourth antenna module 400 to the second frequency band from 5150 MHz-5925 MHz. The placements of antenna modules 100, 200, 300, and 400 are optimized for VSWR (Voltage Standing Wave Ratio) as shown in the sector module 30 in FIG. 3. In at least one embodiment, the antenna modules 100, 200, 300, and 400 are placed at optimized positions so that the VSWR does not degrade below a desired VSWR.

The apparatus 10 in the exemplary embodiment of FIG. 3 includes the pair of first-band sets (e.g. antenna module 100) of radiating elements 12 for radiating in the first frequency band of 696 MHz to 960 MHz. The antenna module 100 is mounted on the sector module 30 along a longitudinal axis 14 defined by the sector module 30. In the exemplary embodiment of FIG. 3, the longitudinal axis 14 is a central axis of the sector module 30. The sector module 30 of the illustrated embodiment has a vertically illustrated length no greater than 570 mm (23.5 inches) and a horizontally illustrated width no greater than 280 mm (11.0 inches).

The antenna module 100 includes a proximate first-band set (e.g. lower first-band set 18) that is proximate to one end (e.g. the lower, connectorized end 20) of the sector module 30. The antenna module 100 also includes a distal first-band set (e.g. upper first-band set 22) that is distal from the lower, connectorized end 20.

The apparatus 10 in the exemplary embodiment of FIG. 3 includes the plurality of second-band sets (e.g. antenna module 400) of radiating elements 12 for radiating in the second frequency band of 5150 MHz-5925 MHz, which is a higher frequency band than the first frequency band of 696 MHz to 960 MHz. The antenna module 400 in the exemplary embodiment is mounted on the sector module 30 along (i.e. collinear with) the longitudinal axis 14 between the lower first-band set 18 and the upper first-band set 22, which are also along (i.e. collinear with) the longitudinal axis 14. As can clearly be seen in FIG. 3, the antenna modules 200 and 300 are not along (i.e. not collinear with) the longitudinal axis 14 because they are alongside the longitudinal axis 14.

Figure 4:
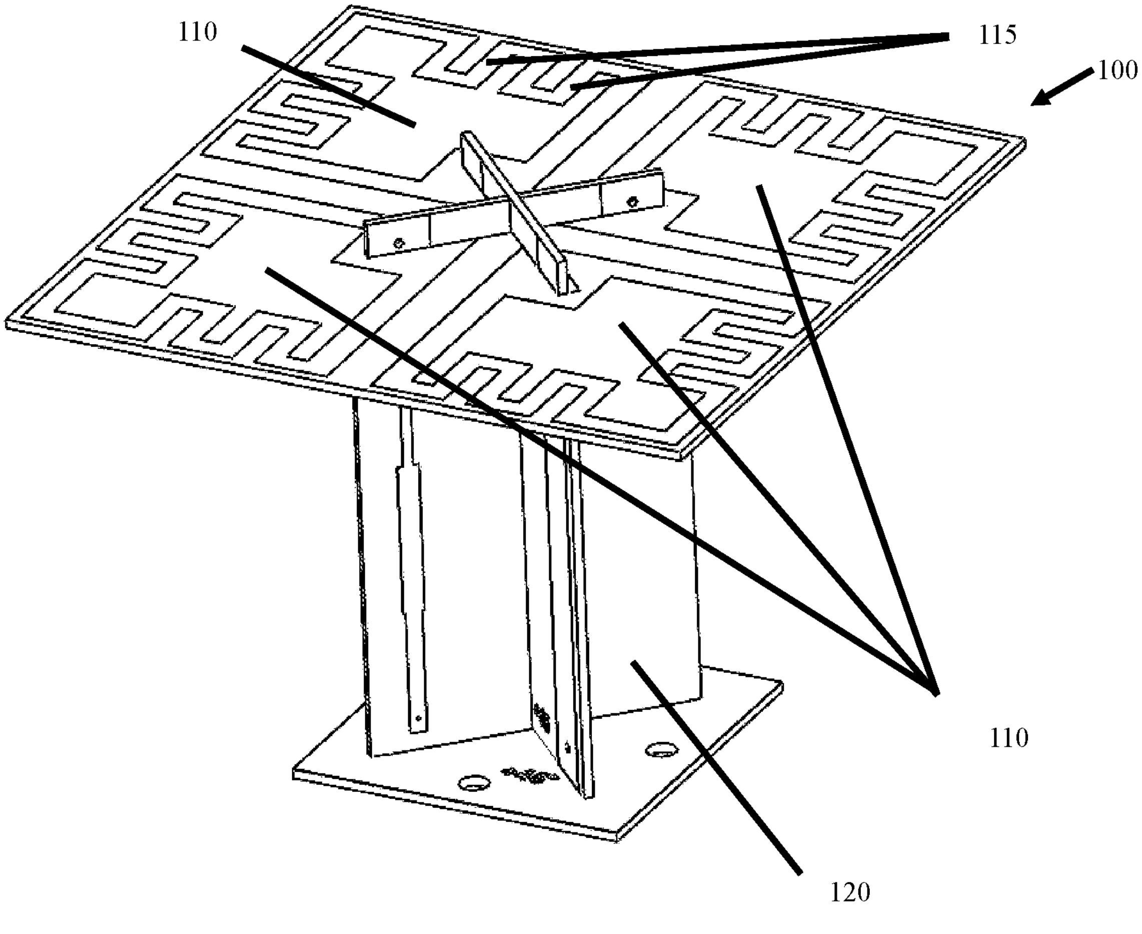
FIG. 4 is a perspective top-view structure of the first wideband antenna module and its radiating elements operating from 696 MHz-960 MHz for use in the small cell antenna of FIG. 1, according to the first embodiment of the invention.
Figure 5:
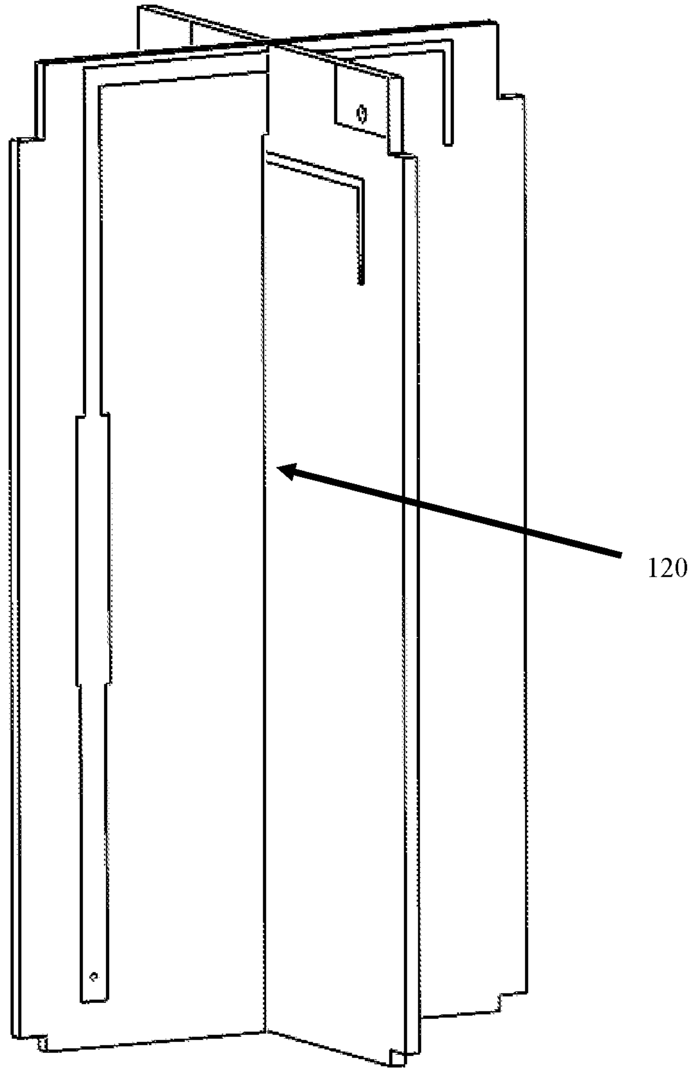
FIG. 5 is a perspective view of a transformer of the first wideband antenna module of FIG. 4, showing connecting traces.
Figure 8:
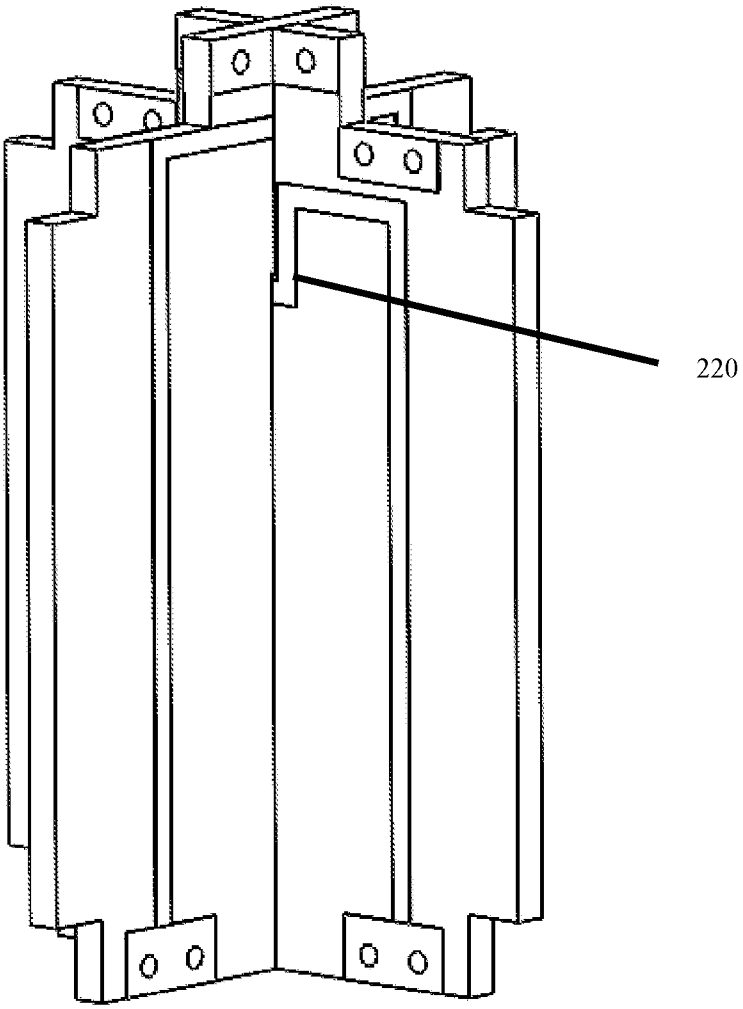
FIG. 8 is a perspective view of a transformer of the second wideband antenna module of FIG. 6, showing connecting traces.

As an example, FIG. 4 depicts a structure of one antenna module 100 operating in frequency band 1 (696 MHz-960 MHz) for the application. Specifically, the antenna module 100 includes two sets of mutually orthogonal and independent radiators 110, and a transformer 120 that is coupled and fed orthogonally to each other. The transformer 120 brings several advantages. Firstly, it is the feeding line of the antenna input and output. Secondly, it improves the impedance matching of the antenna by optimizing the feeding line. Thirdly, it improves antenna isolation by increasing the distance between two feeding lines. The transformer 120 also supports the radiation unit. One end of the feeding microstrip printed circuit board is connected to the radiator 110, and the other end to the power divider. To achieve high isolation, a special transformer structure is utilized at the two sides of the radiator 110. Transformer 120 in FIGS. 4-5 and 220 in FIG. 8 are shown in perspective views illustrating the PCB structures of the transformers embodying the high isolation characteristic.

Specifically, the radiating elements 110 adopt the slotted structure 115, which further reduces the size of the antenna radiating element 110. As a result, the antenna module 100 achieves low profile, high performance, and ease of assembly in a very limited space. The radiation unit 110 is made of PCB material. Preferably, the selected material supports good stability, ductility, and strength, thereby providing the antenna module 100 with high stability and high resistance to bending and deformation.

Thus, in at least some embodiments the proximate first-band set comprises a proximate first-band first-polarity pair of diagonally opposed radiating elements associated with a first polarity and a proximate first-band second-polarity pair of diagonally opposed radiating elements associated with a second polarity orthogonal to the first polarity. Also, in at least some embodiments the distal first-band set comprises a distal first-band first-polarity pair of diagonally opposed radiating elements associated with the first polarity and a distal first-band second-polarity pair of diagonally opposed radiating elements associated with the second polarity.

Figure 6:
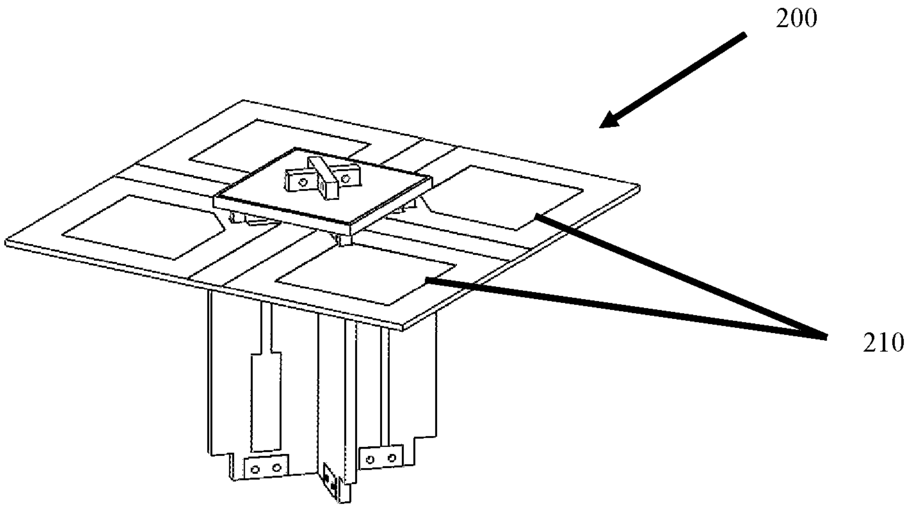
FIG. 6 is a perspective top-view structure of the second wideband antenna module and its radiation elements operating from 1695 MHz-2700 MHz for use in the small cell antenna of FIG. 1, according to the first embodiment of the invention.
Figure 7:
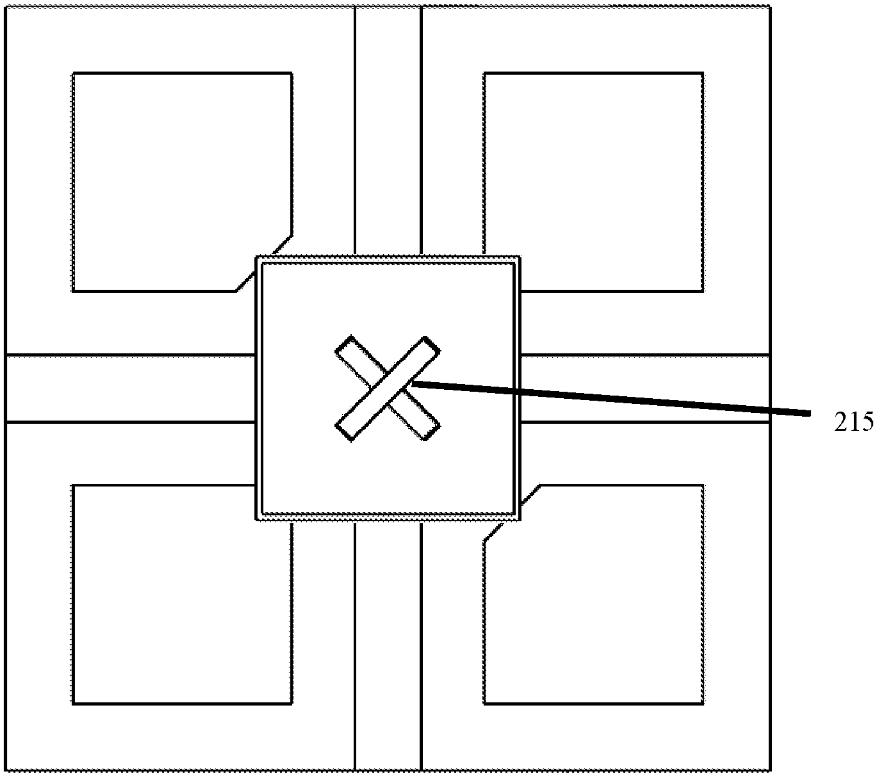
FIG. 7 is a top view of the second wideband antenna module of FIG. 6, showing a conductor element.

As shown in FIGS. 3 and 6-8, the antenna module 200 is a planar dipole structure that has a total radiating length of $\lambda/4$. The bandwidth of the frequency band 3 (1695 MHz-2700 MHZ) is determined by the width and length of the radiation element 210, as well as its height which controls the volume occupied by the element. The bandwidth is also determined by the width and length of transformer 220. A square metal structure 215 (FIG. 7) has been placed on top of radiating elements 210 to further improve the antenna bandwidth. To achieve the desired wideband impedance characteristics, the conductor element 215 is positioned on the top surface of the radiator element 210 to improve the bandwidth characteristic of the antenna. Antenna module 200 in FIG. 6 is a perspective view illustrating the top PCB structure of the radiator 210 embodying the ultra-wideband antenna.

Specifically, the antenna module 200 includes a radiator 210 and a transformer 220 that is coupled and fed orthogonally to each other. Transformer 220 brings several advantages in the same fashion as transformer 120 to the antenna module 100. The transformer 220 is connected to the upper and lower surfaces of the radiating element to increase the isolation of the antenna. The antenna module 200 is also made of PCB material with good stability, ductility, and strength.

Thus, the sector module 30 (FIG. 2) defines a left side of the sector module and defines a right side of the sector module. In at least some embodiments, the apparatus 10 comprises a plurality of left-side third-band sets of radiating elements for radiating in a third frequency band having frequencies between the first and second frequency bands, and further comprises a plurality of right-side third-band sets of radiating elements for radiating in the third frequency band, the plurality of left-side third-band sets being disposed on the sector module at the left side, the plurality of right-side third-band sets being disposed on the sector module at the right side. In at least some embodiments, the third frequency band is from 1695 MHz to 2700 MHZ. In at least some embodiments, each left-side third-band set of the plurality of left-side third-band sets comprises a left-side third-band first-polarity pair of diagonally opposed radiating elements associated with a first polarity and a left-side third-band second-polarity pair of diagonally opposed radiating elements associated with a second polarity orthogonal to the first polarity, and each right-side third-band set of the plurality of right-side third-band sets comprises a right-side third-band first-polarity pair of diagonally opposed radiating elements associated with the first polarity and a right-side third-band second-polarity pair of diagonally opposed radiating elements associated with the second polarity. In at least some embodiments, the plurality of left-side third-band sets comprises two of the left-side third-band sets, and the plurality of right-side third-band sets comprises two of the right-side third-band sets.

Figure 9:
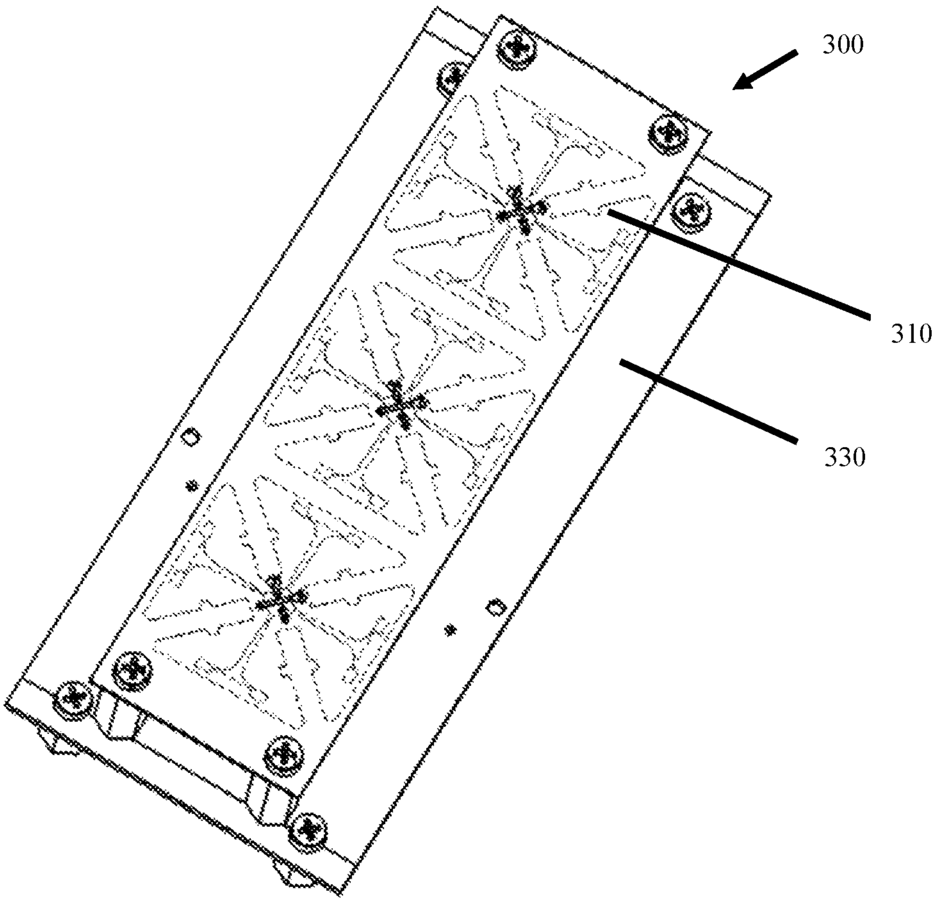
FIG. 9 is a perspective and top-view structure of the third wideband antenna module and its radiation elements operating from 3300 MHz-4200 MHz for use in the small cell antenna of FIG. 1, according to the first embodiment of the invention.
Figure 10:
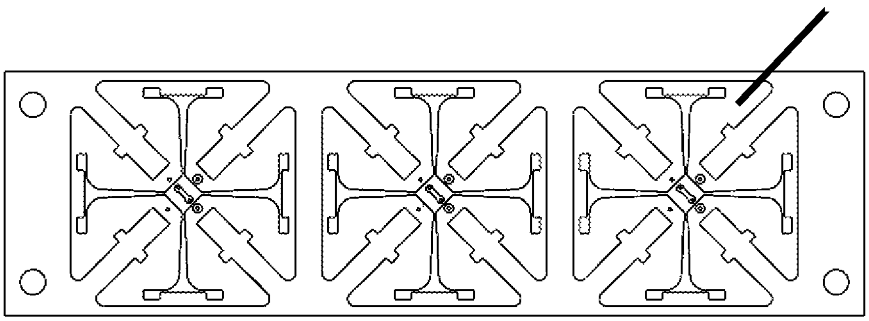
FIG. 10 is a top view of the third wideband antenna module of FIG. 9, showing radiating elements.

As shown in FIGS. 3 and 9-10, the antenna operating at frequency band 4 (3300 MHz-4200 MHz) includes two sets of mutually orthogonal and independent radiation unit antenna modules 300. Specifically, the antenna module 300 includes a radiator 310 and a feeding cable coupled orthogonally to each other. The radiating element 310 is a planar folded dipole structure that achieves ±45° polarization, broad bandwidth, high isolation, and low VSWR. Three antenna radiating elements are arranged in a line to form an antenna array to improve the antenna gain. One end of the feeding cable is connected to the radiator 310, and the other end to one end of the feeding network 330. The other end of the feeding network is connected to the power distributor. The antenna module 300 is also made of PCB material with good stability, ductility, and strength.

Thus, the apparatus 10 comprises a plurality of left-side fourth-band sets of radiating elements for radiating in a fourth frequency band having frequencies between the first and second frequency bands, and further comprising a plurality of right-side fourth-band sets of radiating elements for radiating in the fourth frequency band, the plurality of left-side fourth-band sets being disposed on the sector module at the left side, the plurality of right-side fourth-band sets being disposed on the sector module at the right side. In at least some embodiments, the fourth frequency band is from 3300 MHz to 4200 MHz. In at least some embodiments, each left-side fourth-band set of the plurality of left-side fourth-band sets comprises a left-side fourth-band first-polarity pair of diagonally opposed radiating elements associated with a first polarity and a left-side fourth-band second-polarity pair of diagonally opposed radiating elements associated with a second polarity orthogonal to the first polarity, and each right-side fourth-band set of the plurality of right-side fourth-band sets comprises a right-side fourth-band first-polarity pair of diagonally opposed radiating elements associated with the first polarity and a right-side fourth-band second-polarity pair of diagonally opposed radiating elements associated with the second polarity. In at least some embodiments, the plurality of left-side fourth-band sets comprises three of the left-side fourth-band sets, and the plurality of right-side fourth-band sets comprises three of the right-side fourth-band sets.

Figure 11:
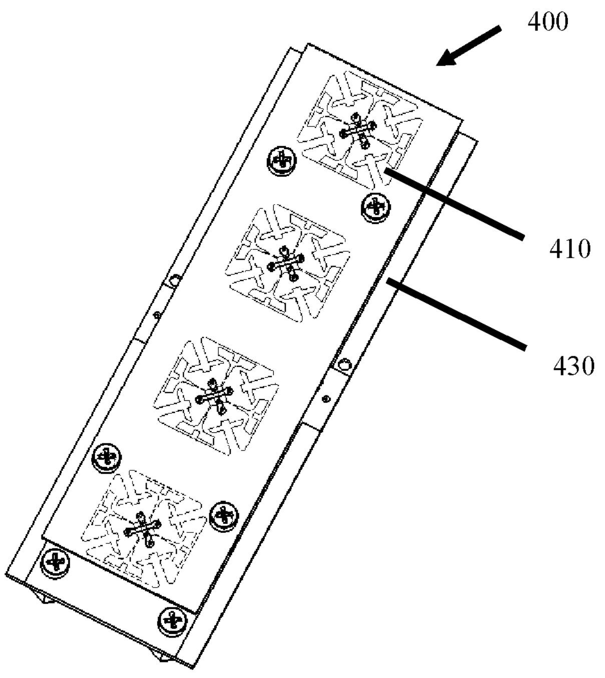
FIG. 11 is a perspective and top-view structure of the fourth wideband antenna module and its radiating elements operating from 5150 MHz-5925 MHz for use in the small cell antenna of FIG. 1, according to the first embodiment of the invention.
Figure 12:
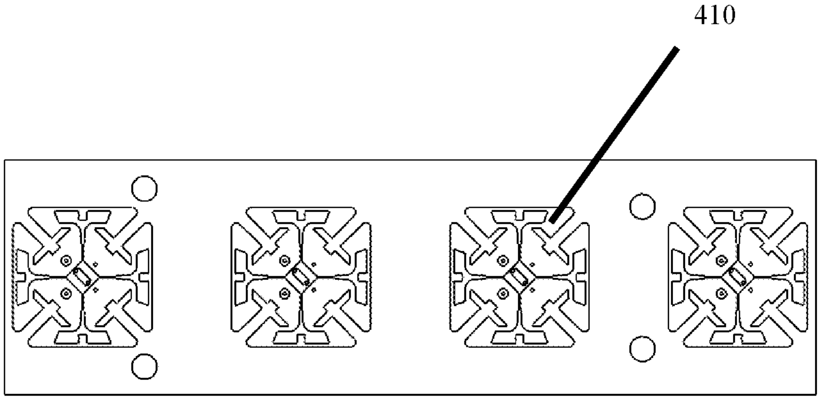
FIG. 12 is a top view of the fourth wideband antenna module of FIG. 11, showing radiating elements.

As shown in FIGS. 3 and 11-12, an antenna operating at frequency band 2 (5150 MHz-5925 MHz) includes two sets of mutually orthogonal and independent radiation unit antenna modules 400. Specifically, the antenna module 400 includes a radiator 410 and a feeding cable coupled orthogonally to each other. The radiating element is a planar folded dipole structure that achieves ±45° polarization, broad bandwidth, high isolation, and low VSWR. Four antenna radiating elements are arranged in a line to form an antenna array to improve the antenna gain. One end of the feeding cable is connected to the radiator 410, and the other end to one end of the feeding network 430. The other end of the feeding network is connected to the power distributor. The antenna module 400 is also made of PCB material with good stability, ductility, and strength.

Thus, in at least some embodiments each second-band set of the plurality of second-band sets comprises a second-band first-polarity pair of diagonally opposed radiating elements associated with a first polarity and a second-band second-polarity pair of diagonally opposed radiating elements associated with a second polarity orthogonal to the first polarity. In at least some embodiments, the plurality of second-band sets comprises four of the second-band sets, and each second-band set of the plurality of second-band sets is mounted along the longitudinal axis.

In addition, the small cell antenna system also includes three antenna reflectors 500, a fiberglass radome 600, an antenna baseplate 700, and fourteen RF (radio-frequency) connectors 800, as illustrated in FIG. 2. In the first embodiment, each RF connector 800 may be a 4.3-10 female (jack) connector having a diameter of 20 mm (0.79") and a length of 24 mm (0.94"), for example. In this embodiment, the radiation unit module operates in a wide frequency with low VSWR and high isolation. Finally, this invention enables mass production thereof through the use of a printed circuit board method, thereby reducing manufacturing costs.

Thus, in at least some embodiments the apparatus 10 includes a first first-band RF connector in electrical communication with the proximate first-band first-polarity pair, a second first-band RF connector in electrical communication with the proximate first-band second-polarity pair, a third first-band RF connector in electrical communication with the distal first-band first-polarity pair, a fourth first-band RF connector in electrical communication with the distal first-band second-polarity pair, a first second-band RF connector in electrical communication with both diagonally opposed radiating elements of the second-band first-polarity pair of each of the second-band sets, a second second-band RF connector in electrical communication with both diagonally opposed radiating elements of the second-band second-polarity pair of each of the second-band sets, a first third-band RF connector in electrical communication with both diagonally opposed radiating elements of the left-side third-band first-polarity pair of each of the left-side third-band sets, a second third-band RF connector in electrical communication with both diagonally opposed radiating elements of the left-side third-band second-polarity pair of each of the left-side third-band sets, a third third-band RF connector in electrical communication with both diagonally opposed radiating elements of the right-side third-band first-polarity pair of each of the right-side third-band sets, a fourth third-band RF connector in electrical communication with both diagonally opposed radiating elements of the right-side third-band second-polarity pair of each of the right-side third-band sets, a first fourth-band RF connector in electrical communication with both diagonally opposed radiating elements of the left-side fourth-band first-polarity pair of each of the left-side fourth-band sets, a second fourth-band RF connector in electrical communication with both diagonally opposed radiating elements of the left-side fourth-band second-polarity pair of each of the left-side fourth-band sets, a third fourth-band RF connector in electrical communication with both diagonally opposed radiating elements of the right-side fourth-band first-polarity pair of each of the right-side fourth-band sets, and a fourth fourth-band RF connector in electrical communication with both diagonally opposed radiating elements of the right-side fourth-band second-polarity pair of each of the right-side fourth-band sets.

Elements of different sizes and shapes may be used to form the antenna by using the techniques of this invention. Therefore, this invention is not limited to the particular embodiments disclosed as the best modes for carrying out the invention, but it is to include all embodiments that fall within the scope of the appended claims. All equivalent structures or equivalent transformations made by using the contents and drawings of this application, or directly or indirectly applied in other related technical fields, are similarly included in the scope of patent protection of this application.

What is claimed is:

1. A multiband dual-polarized quasi-omnidirectional MIMO antenna apparatus, the apparatus comprising:

a first-band pair of first-band sets of radiating elements for radiating in a first frequency band, the first-band pair being mounted on a sector module collinear with a longitudinal axis defined by the sector module; and a plurality of second-band sets of radiating elements for radiating in a second frequency band higher than the first frequency band, the plurality of second-band sets being mounted on the sector module collinear with the longitudinal axis between the first-band sets of the first-band pair.

2. The apparatus of claim 1 wherein the sector module has a length no greater than 570 mm and a width no greater than 280 mm.

3. The apparatus of claim 2 wherein the longitudinal axis is a central longitudinal axis of a printed circuit board.

4. The apparatus of claim 3 wherein the first frequency band is from 696 MHz to 960 MHz, and the second frequency band is from 5150 MHz to 5925 MHz.

5. The apparatus of claim 1 wherein the first-band pair comprises a proximate first-band set that is proximate to one end of the sector module and comprises a distal first-band set that is distal from the one end, the proximate first-band set comprising a proximate first-band first-polarity pair of diagonally opposed radiating elements associated with a first polarity and a proximate first-band second-polarity pair of diagonally opposed radiating elements associated with a second polarity orthogonal to the first polarity, the distal first-band set comprising a distal first-band first-polarity pair of diagonally opposed radiating elements associated with the first polarity and a distal first-band second-polarity pair of diagonally opposed radiating elements associated with the second polarity.

6. The apparatus of claim 5 further comprising a first first-band RF connector in electrical communication with the proximate first-band first-polarity pair, a second first-band RF connector in electrical communication with the proximate first-band second-polarity pair, a third first-band RF connector in electrical communication with the distal first-band first-polarity pair, and a fourth first-band RF connector in electrical communication with the distal first-band second-polarity pair.

7. The apparatus of claim 1 wherein each second-band set of the plurality of second-band sets comprises a second-band first-polarity pair of diagonally opposed radiating elements associated with a first polarity and a second-band second-polarity pair of diagonally opposed radiating elements associated with a second polarity orthogonal to the first polarity.

8. The apparatus of claim 7 further comprising a first second-band RF connector in electrical communication with both diagonally opposed radiating elements of the second-band first-polarity pair of said each second-band set, and further comprising a second second-band RF connector in electrical communication with both diagonally opposed radiating elements of the second-band second-polarity pair of said each second-band set.

9. The apparatus of claim 1 wherein the plurality of second-band sets comprises four of the second-band sets, and wherein each second-band set of the plurality of second-band sets is mounted along the longitudinal axis.

10. The apparatus of claim 1 wherein the sector module defines a left side of the sector module and defines a right side of the sector module, the apparatus comprising a plurality of left-side third-band sets of radiating elements for radiating in a third frequency band having frequencies between the first and second frequency bands, and further comprising a plurality of right-side third-band sets of radiating elements for radiating in the third frequency band, the plurality of left-side third-band sets being disposed on the sector module at the left side, the plurality of right-side third-band sets being disposed on the sector module at the right side.

11. The apparatus of claim 10 wherein the third frequency band is from 1695 MHz to 2700 MHz.

12. The apparatus of claim 10 wherein each left-side third-band set of the plurality of left-side third-band sets comprises a left-side third-band first-polarity pair of diagonally opposed radiating elements associated with a first polarity and a left-side third-band second-polarity pair of diagonally opposed radiating elements associated with a second polarity orthogonal to the first polarity, and wherein each right-side third-band set of the plurality of right-side third-band sets comprises a right-side third-band first-polarity pair of diagonally opposed radiating elements associated with the first polarity and a right-side third-band second-polarity pair of diagonally opposed radiating elements associated with the second polarity.

13. The apparatus of claim 12 further comprising a first third-band RF connector in electrical communication with both diagonally opposed radiating elements of the left-side third-band first-polarity pair of said each left-side third-band set, a second third-band RF connector in electrical communication with both diagonally opposed radiating elements of the left-side third-band second-polarity pair of said each left-side third-band set, a third third-band RF connector in electrical communication with both diagonally opposed radiating elements of the right-side third-band first-polarity pair of said each right-side third-band set, and a fourth third-band RF connector in electrical communication with both diagonally opposed radiating elements of the right-side third-band second-polarity pair of said each right-side third-band set.

14. The apparatus of claim 10 wherein the plurality of left-side third-band sets comprises two of the left-side third-band sets, and wherein the plurality of right-side third-band sets comprises two of the right-side third-band sets.

15. The apparatus of claim 1 wherein the sector module defines a left side of the sector module and defines a right side of the sector module, the apparatus comprising a plurality of left-side fourth-band sets of radiating elements for radiating in a fourth frequency band having frequencies between the first and second frequency bands, and further comprising a plurality of right-side fourth-band sets of radiating elements for radiating in the fourth frequency band, the plurality of left-side fourth-band sets being disposed on the sector module at the left side, the plurality of right-side fourth-band sets being disposed on the sector module at the right side.

16. The apparatus of claim 15 wherein the fourth frequency band is from 3300 MHz to 4200 MHz.

17. The apparatus of claim 16 wherein the plurality of left-side fourth-band sets comprises three of the left-side fourth-band sets, and wherein the plurality of right-side fourth-band sets comprises three of the right-side fourth-band sets.

18. The apparatus of claim 15 wherein each left-side fourth-band set of the plurality of left-side fourth-band sets comprises a left-side fourth-band first-polarity pair of diagonally opposed radiating elements associated with a first polarity and a left-side fourth-band second-polarity pair of diagonally opposed radiating elements associated with a second polarity orthogonal to the first polarity, and wherein each right-side fourth-band set of the plurality of right-side fourth-band sets comprises a right-side fourth-band first-polarity pair of diagonally opposed radiating elements associated with the first polarity and a right-side fourth-band second-polarity pair of diagonally opposed radiating elements associated with the second polarity.

19. The apparatus of claim 18 further comprising a first fourth-band RF connector in electrical communication with both diagonally opposed radiating elements of the left-side fourth-band first-polarity pair of said each left-side fourth-band set, a second fourth-band RF connector in electrical communication with both diagonally opposed radiating elements of the left-side fourth-band second-polarity pair of said each left-side fourth-band set, a third fourth-band RF connector in electrical communication with both diagonally opposed radiating elements of the right-side fourth-band first-polarity pair of said each right-side fourth-band set, and a fourth fourth-band RF connector in electrical communication with both diagonally opposed radiating elements of the right-side fourth-band second-polarity pair of said each right-side fourth-band set.

20. The apparatus of claim 1 further comprising three of the sector modules oriented at 120 degrees relative to each other such that the apparatus is quasi-omnidirectional.

* * * * *